United States Patent

Brendle

[15] 3,655,955
[45] Apr. 11, 1972

[54] RECORDING AND INDICATING SYSTEM PARTICULARLY FOR LOCOMOTIVES AND THE LIKE

[72] Inventor: Thomas A. Brendle, Hamburg, N.Y.
[73] Assignee: Audn Corporation, Hamburg, N.Y.
[22] Filed: Feb. 20, 1970
[21] Appl. No.: 13,070

[52] U.S. Cl. .................. 235/150.52, 235/194, 235/151.31
[51] Int. Cl. ............................................................. G06g 7/16
[58] Field of Search .............. 235/151.31, 194, 150.52, 183; 330/28, 92, 87, 38 M, 108, 98; 328/146

[56] References Cited

UNITED STATES PATENTS

| | | | |
|---|---|---|---|
| 3,466,551 | 9/1969 | Vaughn | 235/194 X |
| 3,525,861 | 8/1970 | Alexander | 235/194 X |
| 3,023,376 | 2/1962 | Smith et al. | 235/150.51 X |
| 3,264,459 | 8/1966 | Ericson | 235/183 |
| 3,309,508 | 3/1967 | Witt | 235/150.52 |
| 3,404,857 | 10/1968 | Tippetts | 235/183 X |
| 3,407,291 | 10/1968 | Thistle | 235/183 |
| 3,435,196 | 3/1969 | Schmid | 235/150.52 X |

Primary Examiner—Malcolm A. Morrison
Assistant Examiner—Edward J. Wise
Attorney—Bean & Bean

[57] ABSTRACT

A system for providing signals indicative of the instantaneous power output and the time integral of power output in both analog and digital form. The analog signal indicative of the instantaneous power output is obtained by providing a switch-controlling digital signal whose frequency is linearly proportional to the instantaneous amplitude of the voltage applied to the d.c. traction motor and whose pulse durations are of fixed value. The controlled switch is normally closed and is connected in shunt with an averaging circuit so that the switch normally short circuits the averaging circuit and provides a path for a current source whose output is linearly proportional to the current supplied to the motor. The averaging circuit, which includes a d.c. current meter, sees a digital signal whose frequency is modulated according to the supplied voltage and whose amplitude is modulated according to the instantaneous current. An integrating capacitor in the averaging circuit drive a relaxation oscillator to provide a digital signal whose frequency is linearly proportional to the instantaneous power so that integration of this signal yields an indication of power-hours. An improved amplifier particularly suitable for accurate amplification of small signals is provided also.

12 Claims, 16 Drawing Figures

INVENTOR
THOMAS A. BRENDLE

BY
Bean & Bean
ATTORNEYS

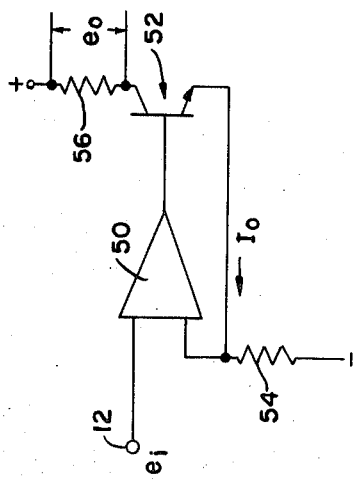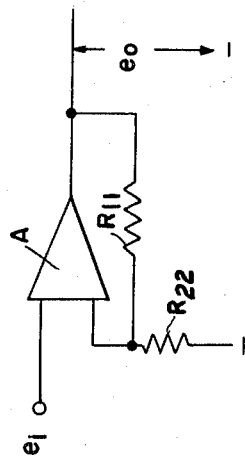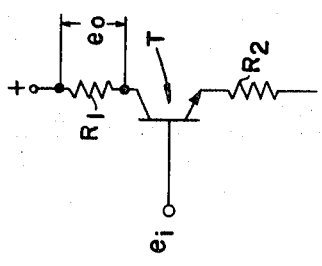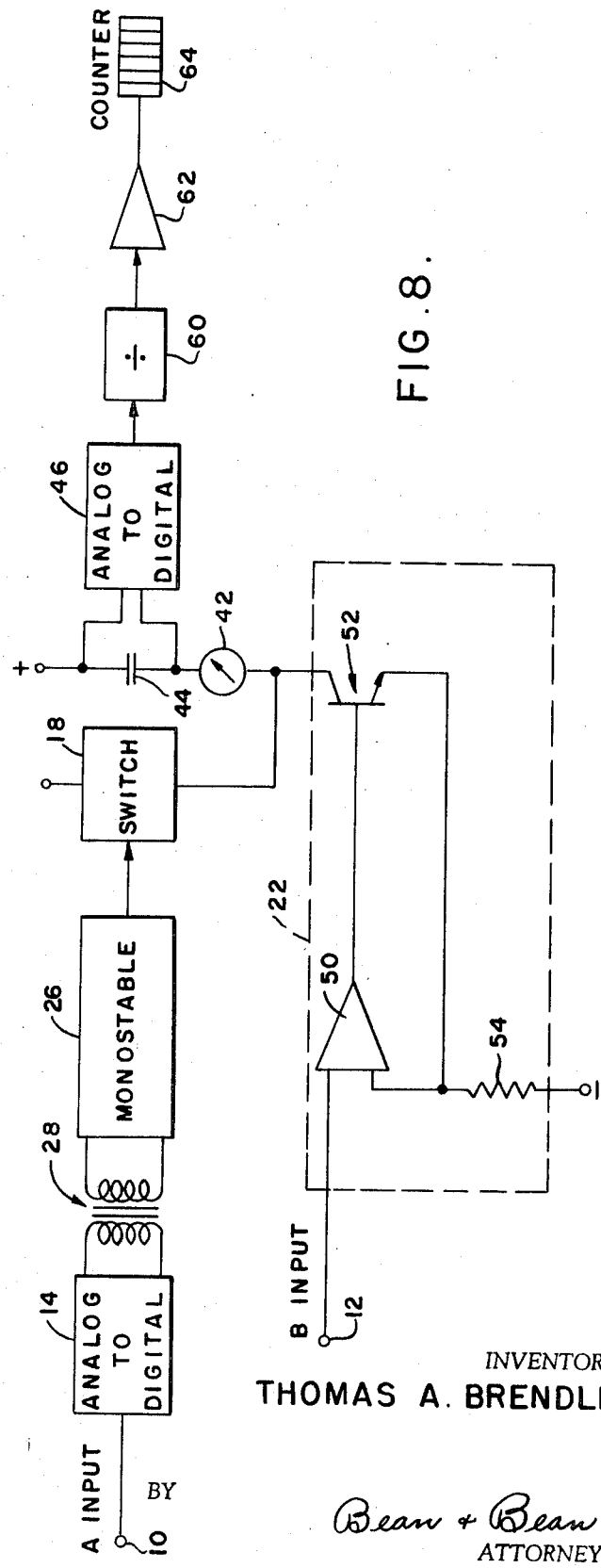
FIG.7.
FIG.6.
FIG.5.
FIG.8.
INVENTOR
THOMAS A. BRENDLE
BY
Bean & Bean
ATTORNEYS

INVENTOR
THOMAS A. BRENDLE

BY

*Bean & Bean*
ATTORNEYS

PATENTED APR 11 1972
3,655,955
SHEET 6 OF 6
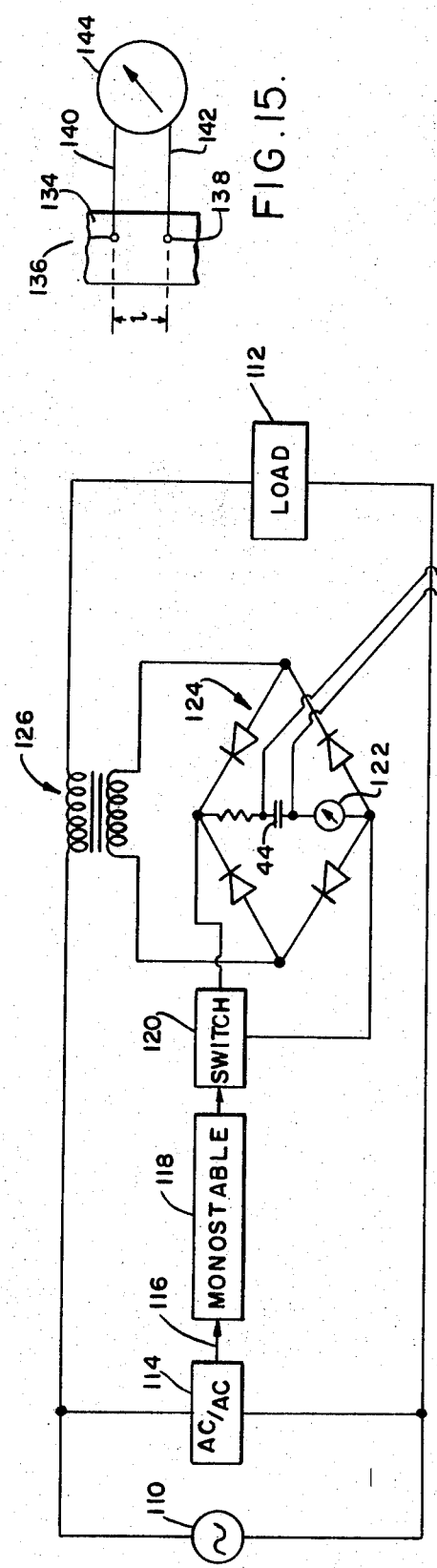
FIG. 13.
FIG. 14.
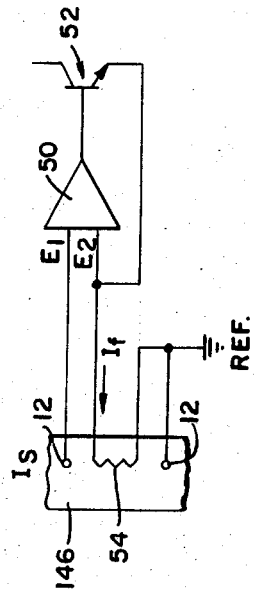
FIG. 15.
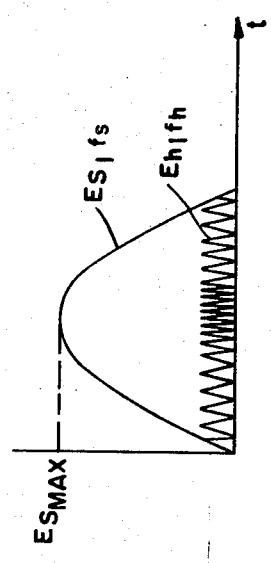
FIG. 16.
INVENTOR
THOMAS A. BRENDLE
BY
*Bean & Bean*
ATTORNEYS

RECORDING AND INDICATING SYSTEM PARTICULARLY FOR LOCOMOTIVES AND THE LIKE

BACKGROUND OF THE INVENTION

As disclosed in copending application, Ser. No. 792,667, filed Jan. 21, 1969, the instantaneous power provided to the DC motor of a locomotive is read out by multiplying the instantaneous values of voltage and current to indicate the horsepower output product. An electromechanical counter is also provided to read out horsepower-hours.

BRIEF SUMMARY OF THE INVENTION

The present invention is directed to improvements in the system of the above copending application and to the provision of an improved amplifier particularly suited for the amplification of small signals with great accuracy.

According to the present invention, a true power output (i.e., watts, horsepower, etc.) rather than a volt-ampere product is obtained by controlling a normally closed switch with a digital signal whose frequency is linearly proportional to a motor voltage or amperage signal and whose pulse widths are of fixed time duration. When closed, the switch passes a signal from a current or voltage source whose output is linearly proportional to the other motor signal (voltage or current) which was not used in providing the digital signal. When the switch is open, the signal from the current or voltage source under control of said other signal is passed to averaging means so that the averaging means sees a digital signal frequency modulated as to one input motor signal and amplitude modulated as to the other motor input signal, the pulse widths being of the aforesaid fixed time duration. The averaging means comprises a DC current meter and/or filter, the former reading directly in power output and the latter providing an analog signal proportional to power output. This frequency and amplitude modulated signal is converted to a further digital signal so that the power output may be recorded easily, counting the pulses of this further digital signal provides an indication of horsepower-hours.

The small multivolt signal developed to measure motor current from the motor current shunt is amplified with high gain and great accuracy by an amplifier arrangement which produces the requisite high gain with an open loop gain which is substantially equal to the reciprocal of the accuracy ratio. That is, for example, for an amplifier requiring a gain of 1,000 as defined as the ratio of the output voltage to the input voltage with an accuracy of 1 in 1,000 (i.e., 0.1 percent) the open loop gain is substantially equal to 1,000. This offers advantages in simplicity, stability, cost and reliability in comparison with conventional operational amplifiers which provide high closed loop gain with very high open loop gain providing the same accuracy.

BRIEF DESCRIPTION OF THE DRAWINGS

FIG. 5 shows a conventional amplifier;

FIG. 6 shows a conventional operational amplifier;

FIG. 7 illustrates the improved amplifier according to this invention;

FIG. 8 shows the essential components of a complete locomotive recording and indicating system according to this invention;

FIG. 13 is a diagram illustrating an improved watt meter concept according to this invention;

FIG. 14 is a wave form associated with FIG. 13;

FIG. 15 illustrates a conventional measurement of the motor current in the current shunt; and FIG. 16 is a view showing a temperature compensating arrangement for measuring the motor current.

DETAILED DESCRIPTION OF THE INVENTION

Figure 1:
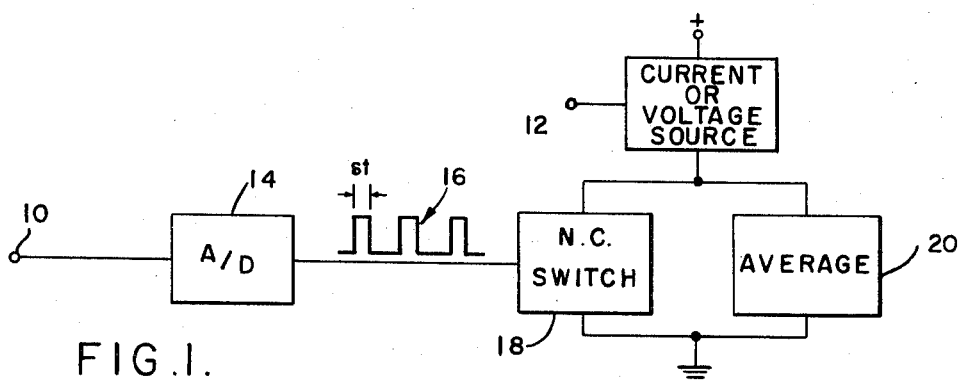
FIG. 1 is a block diagram illustrating certain principles of the present invention.

A method of multiplying two input signals which may be voltage and current signals or any combination thereof involves converting one of the signals to digital form where the frequency of the digital signal is linearly proportional to the amplitude of the one signal and is characterized by pulses of constant time duration. The other signal controls a voltage or current source whose output is proportional to such other signal and which is connected to a suitable averaging circuit or device. A normally closed switch is connected in shunt across the averaging device and this switch is controlled by the digital signal. Thus, the averaging circuit or device sees a digital signal whose pulses are of the fixed time duration and whose frequency is proportional to the one signal, with the amplitude of the pulses being proportional to the instantaneous values of the other signal. The averaging circuit or device produces an analog output or an indication of the average area of the pulses and thus provides, for example, an average current or voltage signal which is proportional to the product of the two signals.

Since the averaging circuit produces an analog current or voltage proportional to the desired product, this signal in turn may be converted to digital form in which the pulse rate or frequency is linearly proportional to the product. By integrating these pulses on a time basis, other useful information may be obtained.

For example, if the original two analog signals are of the type described in copending application, Ser. No. 792,667, filed Jan. 21, 1969, that is, if one is proportional to the voltage supplied to the DC motor or motors of a locomotive and the other is proportional to the current in the locomotive current shunt, the averaging circuit or device produces an indication of the instantaneous power output of the motor or motors whereas the time integral of the digital signal derived from the average signal produces an indication of power-time, for example, horsepower-hours. In addition, the frequency of the digital signal derived from the average signal is itself proportional to the instantaneous power output and may be recorded on a magnetic tape for a permanent record of the instantaneous power output. To provide a visual indication of the instantaneous power output, the averaging circuit may include a simple DC current meter suitably calibrated in horsepower, watts, or other units.

The basic concept discussed above may be described in conjunction with FIG. 1, In this Figure, the analog signals of interest are applied to the terminals 10 and 12, it being of no moment for the time being as to the source of these signals. The analog-to-digital converter 14 converts the signal at the terminal 10 to a pulse train of the form indicated by reference character 16, in which the pulse rate or frequency is linearly proportional to the amplitude of the signal at the terminal 10 and wherein each pulse is of fixed time duration δt. This pulse train is applied to a normally closed switch 18 which is in parallel with the averaging circuit or device 20 and both of which are in series with the current or voltage source 22 whose output is controlled by and is linearly proportional to the input signal at the terminal 12. The switch 18 is opened for time δt for every pulse of the train 16 applied thereto so that the average current or voltage which the averaging means 20 sees is proportional to the product of the signals at the terminals 10 and 12.

Figure 2:
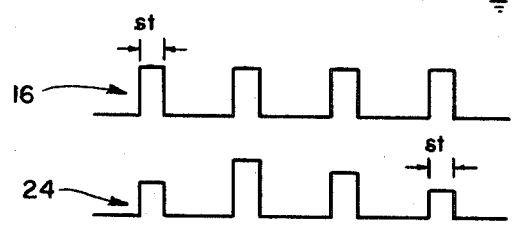
FIG. 2 is a diagram showing certain wave forms associated with FIG. 1.

It is to be noted that the signal which the means 20 sees is of digital form as is indicated by the reference character 24 in FIG. 2 as related in time to the pulse train 16, and wherein its frequency is proportional to the value of the signal at the terminal 10 (being identical with the frequency of the pulse train 16) and wherein the pulse amplitudes are proportional to the value of the signal at the terminal 12.

It will be appreciated that the means 20 may take the form of a simple DC current meter suitably calibrated so that the product of the two signals may be read out directly in visual fashion.

Figure 3:
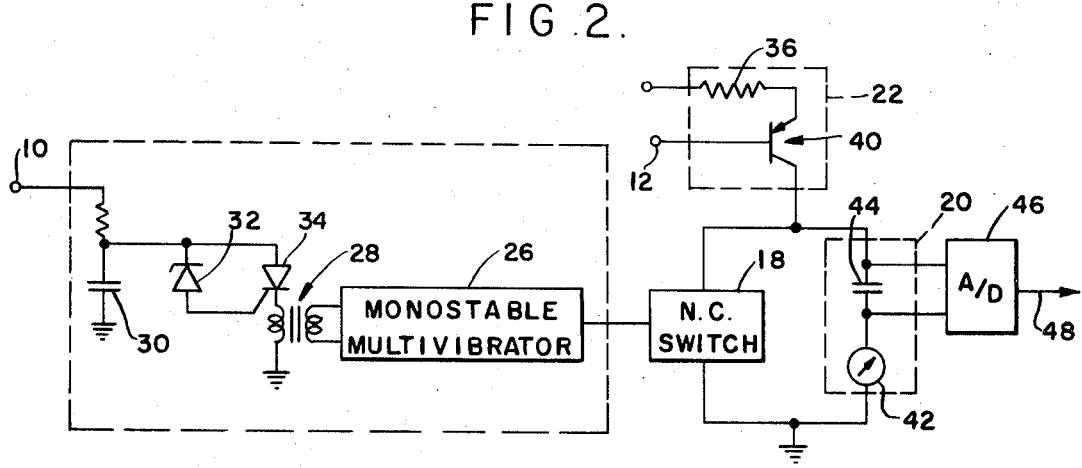
FIG. 3 is a schematic-block diagram based upon FIG. 1 and illustrating further certain principles of this invention.

This as well as further features of the invention may be appreciated from a study of FIG. 3. In this Figure, the analog-to-digital converter 14 of FIG. 1 is shown as a relaxation oscillator inductively coupled to a monostable multivibrator 26 by means of a transformer 28. The oscillator includes the capacitor 30 connected to the terminal 10 so that when the voltage builds up across this capacitor exceeding the breakdown voltage of the zener diode 32, the SCR 34 dumps the capacitor through the primary winding of the transformer 28 to trigger the multivibrator from its stable state.

The device 22 of FIG. 1 is shown as a current source in the form of the resistor 36 and PNP device 40 connected as shown in series with the parallel circuits 18 and 20. The averaging means 20 comprises the DC current meter 42 as previously mentioned and the integrating capacitor 44. the capacitor 44 is used to provide an actuating signal for the analog-to-digital converter 46 whose output at 48 may be used to record digitally the product of the two signals at the terminals 10 and 12, or whose output may be integrated as for example by driving a mechanical counter to record the time integral of the product. Thus, if the inputs at the terminals 10 and 12 are of the nature discussed above and in copending application, Ser. No. 792,667, the meter 42 reads the instantaneous power output directly (i.e., the horsepower) while the integrated output 48 indicates horsepower-hours.

Figure 4:
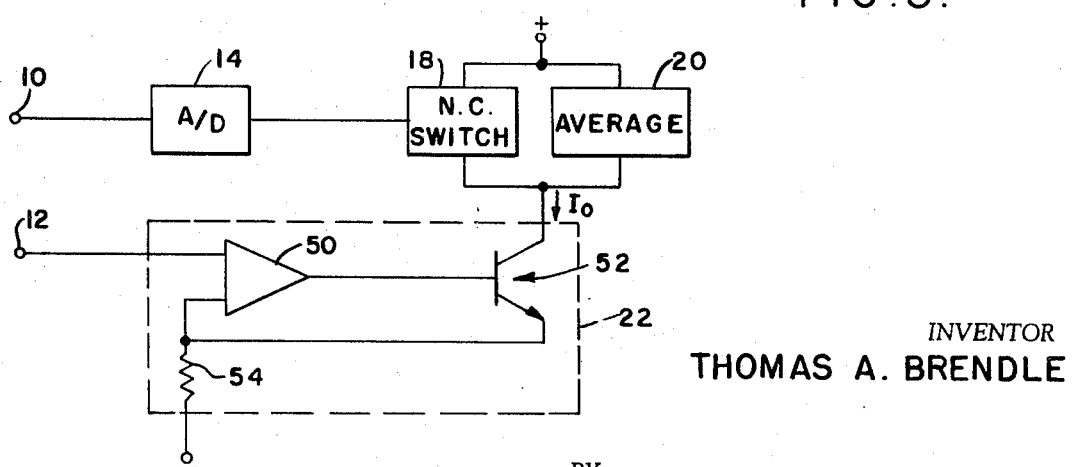
FIG. 4 is a diagram illustrating an improved amplifier as used in the system of the present invention.

A further feature of this invention, particularly useful in the locomotive system as disclosed in the above copending application, is illustrated in FIG. 4. In this Figure, the signal at terminal 10 is obtained by utilizing only a small initial and linear portion of the exponential voltage charge of a relatively large capacitor which is then returned or dumped to a fixed reference potential, as disclosed in the aforesaid copending application, while the signal at the terminal 12 is a small millivolt signal obtained from the locomotive current shunt. It is essential that this small millivolt signal be amplified to a usable value without significant inaccuracy and devoid of error due to temperature drift, offset voltage or the like from the amplifying devices. According to the present invention, these and other advantages are obtained by using a closed loop gain-of-one amplifier 50 and semiconductor device 52 as a current source 22.

To appreciate the principles involved, reference is had to FIGS. 5 and 6. FIG. 5 shows a simple transistor T or similar device which is well known to operate as an amplifier if the output $e_o$ is taken between the plus rail and the collector as shown, the input $e_{in}$ being applied to the base so that the output $e_o$ is given by the relation $e_o = e_{in}(R_1/R_2)$. This circuit, however, is of impractical form for amplifying small input voltages since it suffers from temperature effects, base-emitter drops, etc.

A conventional operational amplifier A such as is shown in FIG. 6 may provide the requisite accuracy, but suffers not only from complexity but also in the requirement of high open loop gain to provide the closed loop gain of required accuracy. To illustrate, referring to FIG. 6, assume a closed loop gain requirement of 1,000. Since the closed loop gain is given by the ratio of $e_o$ to $e_i$ and since $$e_0 = a\left(e_i - \frac{R_{22}e_0}{R_{11}+R_{22}}\right); \; e_{0+a}\frac{R_{22}e_0}{R_{11}+R_{22}} = ae_i$$

where $a$ is the open loop gain.

By letting $(R_{22})/(R_{11}+R_{22}) = K$ the closed loop gain $e_o/e_i = 1,000 = a/(1+aK)$. Assuming the closed loop gain accuracy shall be 0.1 percent, that is, 999 minimum to 1001 maximum, and assigning a standard value of one one-thousandth for $K$ for a closed loop gain of 1,000

$$\frac{a}{1+\frac{a}{1000}} = 999 \text{ min. which gives } a = 990,000$$

Thus, a conventional operational amplifier providing a closed loop gain of 1,000 accurate to 0.1 percent requires an open loop gain of approximately $10^6$.

In contrast, the amplifier used in the system shown in FIG. 4, and which is illustrated by itself in FIG. 7, subjected to the same requirements (i.e., final gain of 1,000 with the accuracy of 0.1 percent) must provide the closed loop gain $e_o/e_i = 1,000$ with, as before, the ratio of the resistance values $K = R_{56}/R_{54} = 1/1000$. Since the amplifier 50 is a gain-of-one device, $e_i = I_oR_{54}$ where $R_{54}$ is the value of the resistor 54, and from the open loop gain $a'$ relation, $e_o = a'(e_i - I_o R_{54})$ which reduces to $$\frac{e_0}{e_i} = \frac{a'}{1a'}$$

0.999 minimum to 1.001 maximum.

For the minimum case, $a'$ 999 which shows that for the conditions specified (i.e., final gain of 1,000 $K = 1/1000$ and closed loop gain accuracy = 0.1 percent) the open loop gain is approximately equal to the final gain. Thus, the amplifier system of FIG. 7 with an open loop gain of 1,000 is arranged to provide a final gain of 1,000 whereas a conventional amplifier as in FIG. 6 requires an open loop gain of approximately 1 million to provide a final gain of 1,000 with equivalent accuracy. The amplifier system of FIG. 7 thus provides an open loop gain ratio improvement of $10^3$ with attendant benefits of stability, simplicity and reliability. In general, the amplifier arrangement of FIG. 7 provides high final gain and an open loop gain which is substantially the reciprocal of the accuracy ratio. In the above case, the accuracy ratio is 1 per 1,000 (0.1 percent) so that the open loop gain is approximately 1,000.

A complete block diagram of a system particularly adapted for use in conjunction with locomotives and incorporating the several features of the present invention is illustrated in FIG. 8 wherein reference characters relating to elements and systems described hereinabove are repeated for clarity. In addition to the system as thus far described, the output of the converter 46 as previously described is applied to a dividing circuit 60 to provide conversion to horsepower-hours and the output thereof is applied to the driving amplifier 62 which actuates a conventional mechanical counter 64. Thus, each pulse from the converter 46 represents a predetermined horsepower output and, with the specific counting or division as indicated by the circuit 60, each pulse output therefrom represents 10 horsepower-hours and each such pulse drives the power monostable 62 which in turn drives the horsepower-hour counter 64.

Figure 9:
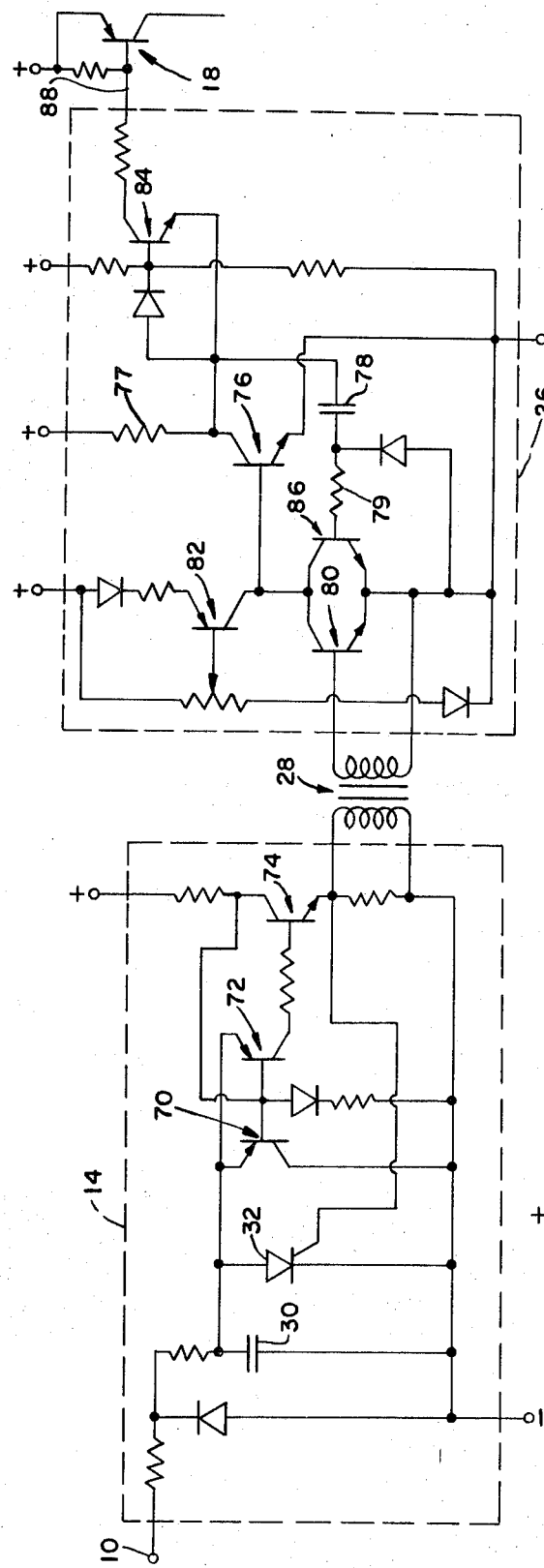
FIGS. 9–12 are circuit diagrams of the system shown in FIG. 8.
Figure 11:
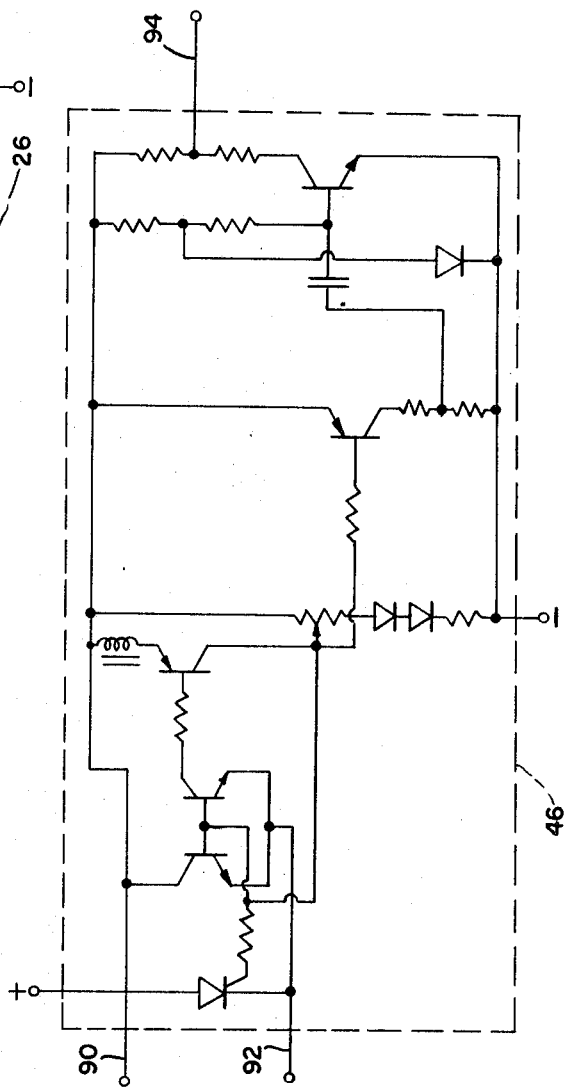

The circuit diagrams of this system are shown in FIGS. 9-12. In FIG. 9, the analog-to-digital converter 14 will be seen to be a somewhat more sophisticated version of the relaxation oscillator described in conjunction with FIG. 3. When the voltage across the capacitor 30 builds up due to the presence of the signal at the terminal 10, the transistors 70 and 72 start to conduct, the latter causing conduction of the transistor 74 which produces the output pulse across the primary of the transformer 28. The capacitor 30 is dumped simultaneously by conduction of the transistor 70 and the SCR 32 to assure that the capacitor 30 is returned to reference potential.

In the pulse shaping circuit 26, the transistor 76 is normally conducting and thereby maintains the capacitor 78 discharged. The output of the converter 14 across the primary of the transformer 28 produces a spike in the secondary of this transformer turning the transistor 80 on providing a path to the negative rail for the transistor 82 driving the transistor 76 nonconductive. The transistor 84 then cuts off to open the switch 18 and a charging path for the capacitor 78 is then established through the resistor 77 which, depending upon the value of the capacitance 78 and the resistors 77 and 79 maintains the normally closed switch 18 open for the output pulse duration time $\delta t$. While the capacitance 78 is charging, the transistor 86 is conductive, thus allowing the capacitance 78 to charge to some predetermined value in response to an initiating spike at the transformer secondary and thereby assuring constant pulse width output at the conductor 88. The value of the capacitance 78 is chosen so that the pulse width $\delta t$ equals or exceeds the period of the pulse output of the converter 14 when the output at the terminal 10 is at or approaches the high value thereof. This allows the pulse output of the pulse shaping circuit 26 to go half rate at some time prior to attainment of the maximum input at 10 and this may be utilized for precise overvoltage protection of external locomotive circuits. For example, the input at the terminal 10 is derived from the locomotive high voltage equipment and may range from a voltage of zero to nominally 1,500 volts DC and the pulse shaper circuit 26 may be constructed to go half pulse rate at around 1,450 volts.

Figure 10:
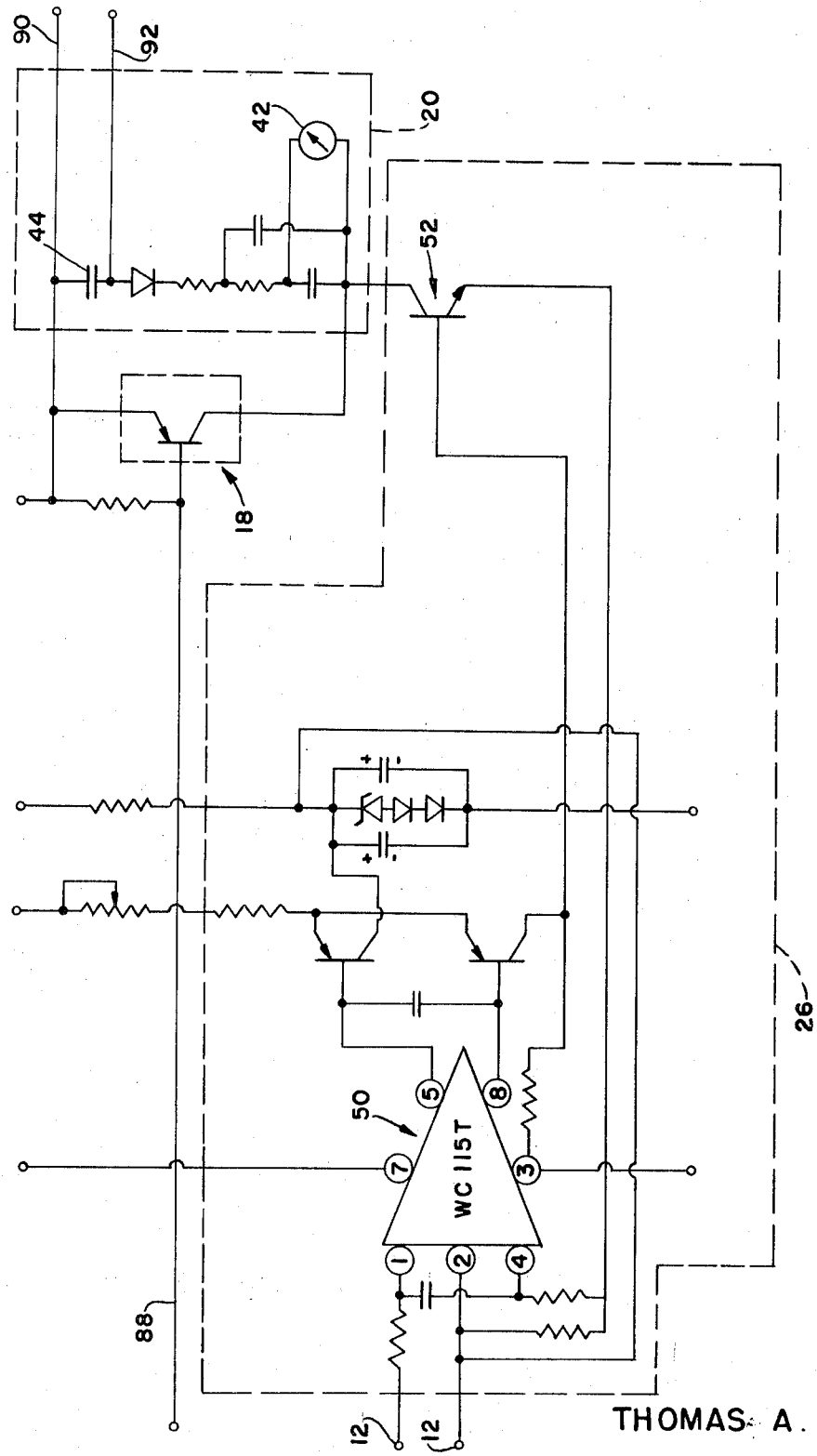

With reference to FIG. 10, the input terminal pair 12 as shown therein is derived from the locomotive current shunt and the input may range from a voltage of zero to nominally 100 millivolts. Thus, the gain of one amplifier 50 and current source 52 previously described in conjunction with FIG. 7 and FIG. 4 is admirably suited for such a system. The switch 18, being normally closed, shunts the averaging circuit 20 until a pulse output appears at the conductor 88 to allow the circuit 20 to see the output of the current source 26 for a duration of $\delta t$. The operation of the DC meter 42 is as described hereinabove and the amplitude and frequency modulated signal charges the capacitor 44 across which the conductors 90 and 92 are connected.

The converter 46 shown in FIG. 11 is, again, a relaxation type oscillator serving to dump the capacitor 44 when the same has reached a voltage level of predetermined value so as to produce, at the output terminal 94, a pulse train output whose frequency is linearly proportional to the average current seen by the capacitor 44.

Figure 12:
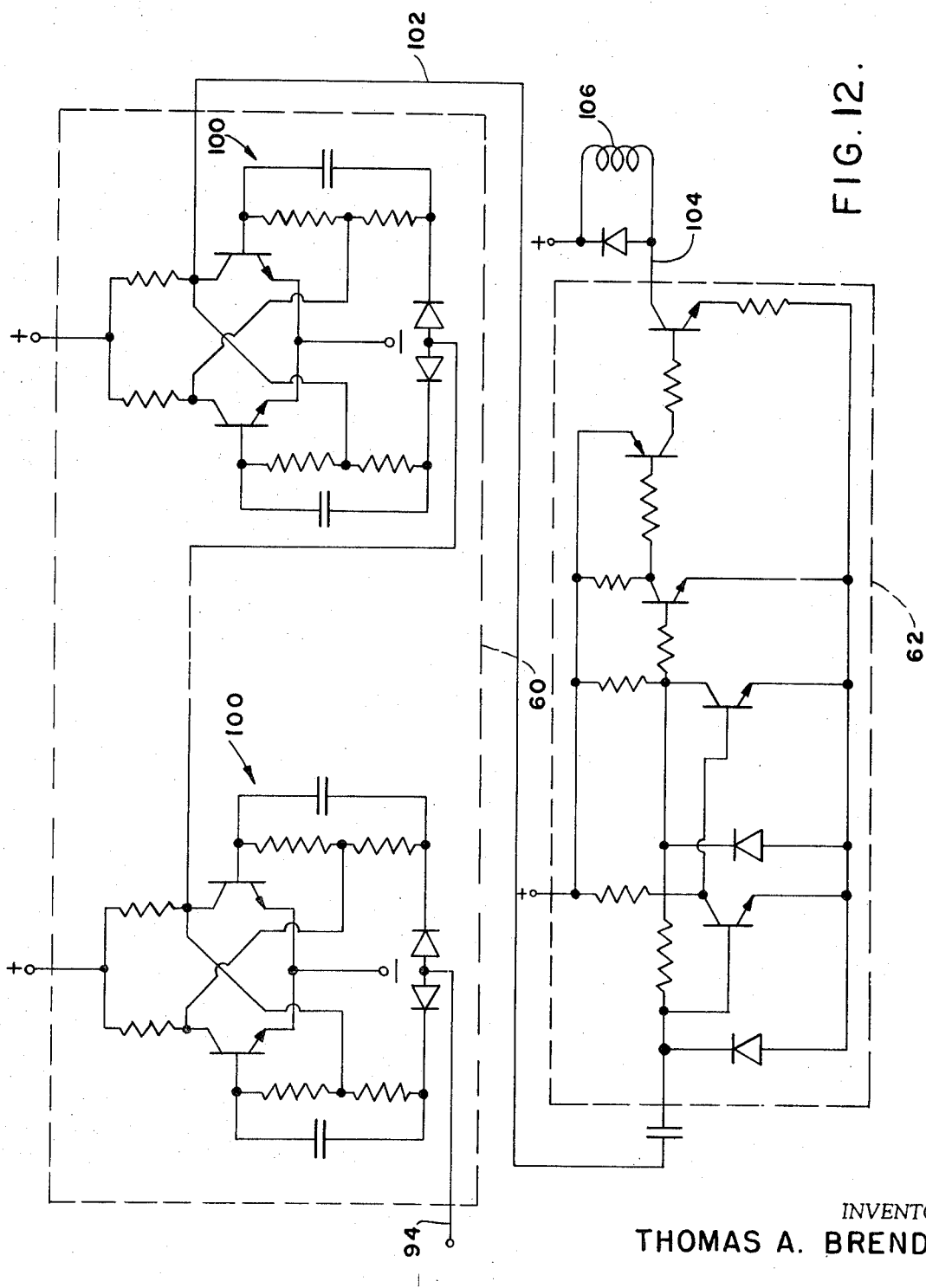

The dividing circuit 60 shown in FIG. 12 may comprise simply a plurality of frequency divider circuits 100 to provide the requisite division to convert the horsepower output signal to a signal representative of horsepower hours which is applied to the power monostable circuit 62 so that for every output pulse at the conductor 102 of the frequency divider, a power pulse output appears at the conductor 104 to actuate the solenoid or other actuating mechanism for the counter 64, a solenoid winding 106 being indicated in FIG. 12 for this purpose.

As has been discussed above, an important feature of the present invention involves means whereby the product of two analog signals is provided by a relatively simple relationship. One signal is available in digital form having fixed pulse widths and of frequency linearly proportional to the instantaneous value of the analog signal of interest. The other signal controls a voltage or current source producing an output linearly proportional to the instantaneous value of the other analog signal of interest and a switch is arranged to shunt this latter output except when opened by the digital signal which allows an averaging device to see the said latter output during the time period of each digital pulse. This produces a frequency and amplitude modulated signal in the averaging circuit which, with suitable filtering, produces an analog output indicative of the instantaneous power output represented by the two original signals. This latter analog output may be a visual one, i.e., the DC meter described averages the current and reads power directly. On the other hand, by passing the current through an integrating capacitor as described above and connecting the voltage thereacross to some form of relaxation oscillator or its equivalent produces, at the output of the oscillator, a digital signal whose frequency is linearly proportional to the the average current or voltage which is indicative of the power output. This digital signal itself is useful, not only because its integral may yield power-hours, but also because it may be employed to record the power output in digital fashion. These features are extremely valuable in terms of locomotive performance systems as well as in related applications.

However, the above general system may also be extended to cover systems in which the original signals are not of analog form, i.e., they are characterized by some periodicity. Here, the problem is not essentially different for, in fact, it is merely necessary to convert one signal into the requisite digital form and the other into the requisite analog form.

To illustrate, attention is directed to FIG. 13 wherein an alternating current source 110 is shown connected to a load 112. It is common under such conditions to determine the volt-ampere product supplied to the load which, because the voltage is seldom in phase with the current for ordinary loads, does not indicate the true power consumed. Often, it is desirable to indicate the true power directly and the system of this invention provides for this.

The AC-to-AC converter 114 produces an output signal at 116 whose frequency is linearly proportional to and in phase with the voltage amplitude of the supply signal $E_s$. As will be evident hereinafter, it is essential that the frequency $fn$ of the signal at 116 be appreciably greater than the frequency $fs$ of the supply when $E_s$ is equal to about ($1/10$) $E_s$ maximum. This is illustrated in FIG. 14.

The signal from the converter 114 is applied to the pulse shaper 118 which, as before, produces a pulse train at the continuously varying frequency $fn$ in which the pulse durations are of fixed value, and this digital signal is connected to the normally closed switch 120. The switch 120 is connected in shunt with the averaging device 122 which, as shown, may be a direct current meter. The other signal, of analog form and in phase with the current, is obtained by coupling the rectifier bridge 124 to the supply by means of the transformer 126. As before, the current seen by the meter 122 is frequency and amplitude modulated and the meter reads directly in true instantaneous power. Obviously, the averaging circuit may employ a filter such as the capacitor 44 of FIG. 3 and additional circuits 46, 60 and 62 in conjunction with a counter 64 to provide, as well, a power-time output. It is important to note that in all cases, both instantaneous power and the time integral of power are available as digital signals which may be recorded easily.

Since the multiplication performed produces the product of instantaneous values of voltage and current, the output or product is true watts and this product is obtained regardless of the wave forms of the current and voltage so that the device is operable on any varying voltages.

As disclosed in the aforesaid copending application, the signal at the terminal 10 may be obtained by impressing the motor voltage across an RC circuit, the capacitor 30 and resistances 130, 132 of FIG. 9, in which the resistance value (resistor 130, FIG. 9) is relatively large and the relaxation circuit (14, FIG. 9) is such that the capacitor is returned to reference potential when its voltage builds up to a value which is quite small as compared to the usual values of motor voltages (motor voltage may range typically between zero and 1,500 volts). In this way, the voltage build up across the capacitor is essentially linear and a very accurate digital indication of the voltage impressed across the RC circuit is obtained. A further advantage resides in the fact that the pulse transformer 28 conveniently isolates the high motor voltage from the rest of the system.

As is also disclosed in the above copending application, the signal at the terminal 12 is obtained from the conventional motor current shunt. FIG. 15 illustrates a conventional method for measuring the motor current passing through the current shunt 134. The shunt 134 is made of zero or very small temperature coefficient material so that the voltage drop between the lead wire connections 136 and 138, spaced apart by some calibrated distance 1, remains independent, and substantially independent of any temperature change in the shunt material. The lead wires 140 and 142 are of calibrated resistance values so that the meter 144 accurately reads the motor current. FIG. 15 explains the reason why relatively expensive zero of very small temperature coefficient shunt materials are employed conventionally.

With the present system, it is possible to use relatively inexpensive material for the current shunt by using the feedback arrangement of FIG. 16. In this figure, it will be seen that the amplifier arrangement previously described is connected such that its feedback resistance 54 is embedded in the bar or current shunt 146 with the further provision that it be constructed of the same material or of material having the same temperature coefficient as the current shunt material. By Ohm's law, $E_i = I_s R_s$, where $I_s$ is the current through the shunt and $R_s$ is the resistance of the shunt between the terminals 12, and $E_2 = I_f R_{54}$.

It will be appreciated that the input impedance of the amplifier 50 is high compared to $R_s$ and $R_{54}$ and $R_{54}$ is high compared to $R_s$. Since the amplifier forces $E_1$ to equal $E_2$, $I_f = (I_s R_s)/(R_{54})$ and since the temperature coefficients for $R_s$ and $R_{54}$ are the same and since their temperatures will also be the same due to their intimate association, $I_f$ will change only with and proportional to $I_s$. For example, if the temperature change increases both $R_s$ and $R_{54}$ by 50 percent, $I_f = I_s (1.5 R_s)/1.5 R_{54} = I_s (R_s/R_{54})$.

What is claimed is:

1. In an electrical system including a load such as an electrical motor and a power supply means for supplying power to such load, the combination of:
   first means for providing a fixed pulse width digital signal output whose frequency is linearly related to one of the instanteous voltage or current power parameters supplied to the load by said power supply means;
   second means for providing a d.c. output signal proportional to the amplitude of the other of said power parameters supplied to the load by said power supply means;
   normally closed switch means connected to said second means normally to shunt said d.c. output signal and actuated to open condition by said digital signal output of said first means; and
   averaging means connected to said second means in parallel with said normally closed switch means for providing an output indicative of the true power output of the load.

2. In the system according to claim 1 wherein said load is a d.c. motor and the digital signal of said first means is derived from the instantaneous voltage being supplied to said d.c. motor whereas the output signal of said second means is derived from a small millivolt signal indicative of the current flowing in the current shunt of said motor.

3. In the system as defined in claim 2 wherein said second means is a high gain, high accuracy amplifier which comprises a unity closed loop gain amplifier having one input which is said small millivolt signal, and a current source controlled by the output of said unity gain amplifier, the voltage proportional to the current output of said current source being applied as the other input to said unity gain amplifier, the final gain of said high gain amplifier being high and the open loop gain of the amplifier used in the closed loop portion of the system being substantially equal to the reciprocal of the accuracy ratio.

4. In the system as defined in claim 1 wherein said averaging means includes an integrating capacitor, and a relaxation oscillator connected across said capacitor for producing a signal whose frequency is linearly related to the product of said parameters.

5. In the system as defined in claim 4 including means for counting the pulse output of said relaxation oscillator for integrating the product of said parameters.

6. In the system as defined in claim 5, including an electromechanical counter driven by the divided output of said relaxation oscillator.

7. In the system as defined in claim 1, wherein said parameters are periodically variable and said first means produces said digital signal in phase with the variable voltage supplied to the load, said second means including a rectifying bridge circuit inductively coupled to the current input to the load to produce said output signal thereof in phase with the variable current to said load, and a d.c. meter connected across said bridge for directly indicating the true power consumed by the load.

8. In the system as defined in claim 1 wherein said averaging means includes a meter visually indicating said true power output.

9. In the system as defined in claim 8 wherein said averaging means also includes an integrating capacitor; and converter means for producing a fixed-amplitude digital signal whose frequency is linearly related to the voltage across said integrating capacitor, whereby said true power output may be recorded in digital fashion.

10. In the system as defined in claim 9 including counter means connected to the digital signal produced by said converter means for indicating the true power-time output of said load.

11. In the system as defined in claim 1 wherein said averaging means includes an integrating capacitor; and converter means for producing a fixed-amplitude digital signal whose frequency is linearly related to the voltage across said integrating capacitor, whereby said true power output may be recorded in digital fashion.

12. In the system as defined in claim 11 including counter means connected to the digital signal produced by said converter means for indicating the true power-time output of said load.

* * * * *